Aug. 25, 1931.  F. W. CALDWELL  1,820,526
TRUCK LOADING MECHANISM
Filed Dec. 27, 1928   2 Sheets-Sheet 2
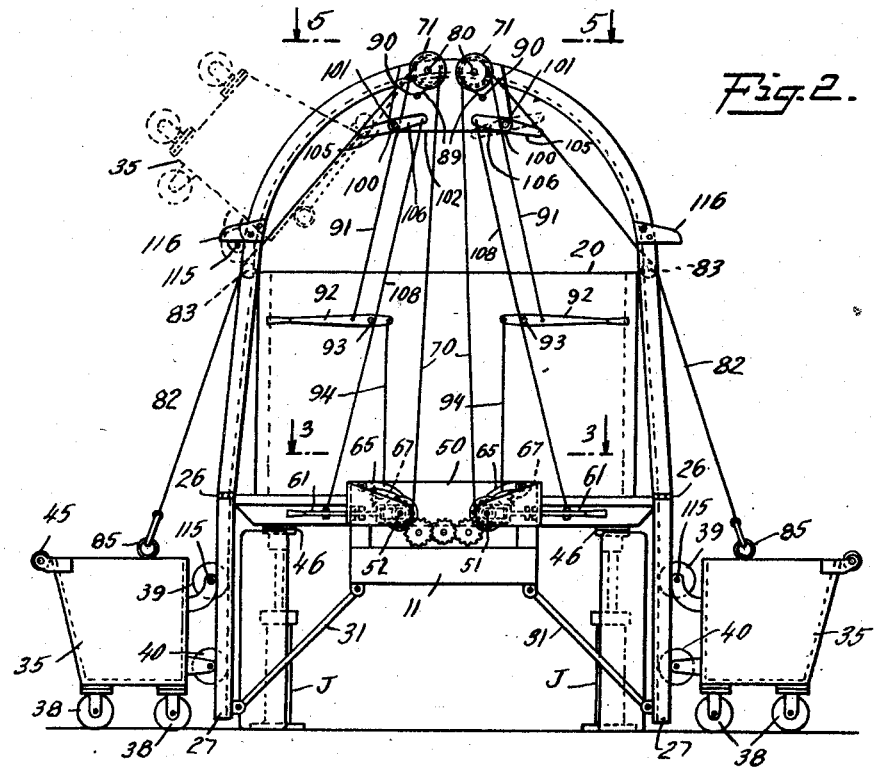
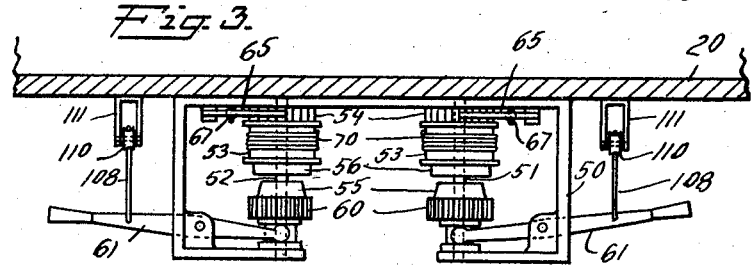
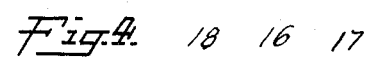
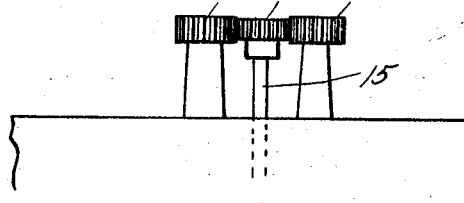
INVENTOR
Frederick W. Caldwell
BY
Marshall Hawley
ATTORNEYS Patented Aug. 25, 1931

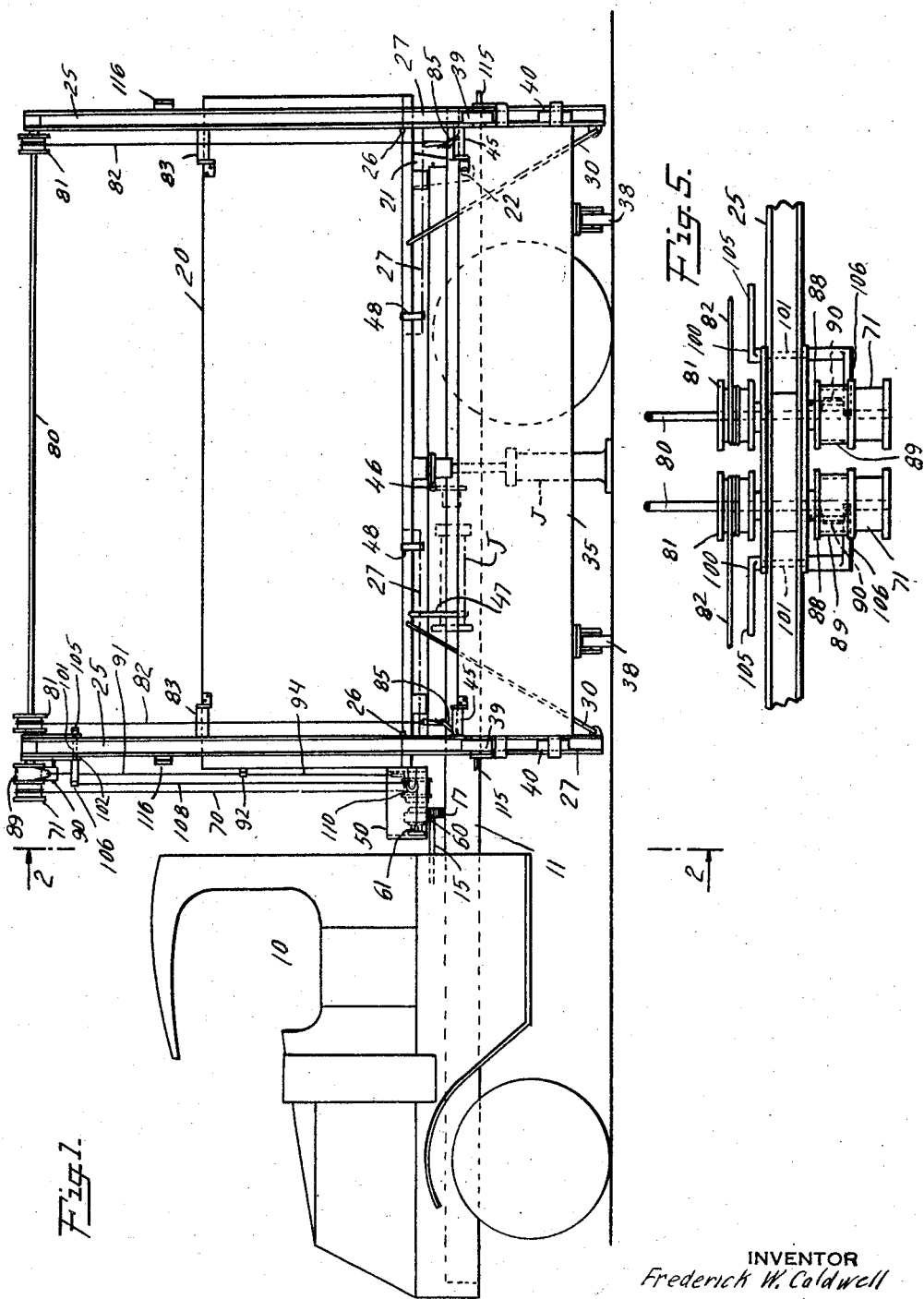

1,820,526

UNITED STATES PATENT OFFICE

FREDERICK W. CALDWELL, OF NEW YORK, N. Y.

TRUCK LOADING MECHANISM

Application filed December 27, 1928. Serial No. 328,736.

This invention relates to mechanism for loading trucks.

At the present time it is the usual practice in loading trucks to manually lift the material to be loaded into the truck. For instance, the loading of ashes or garbage requires two men on the ground to lift the cans or receptacles and at least one man on the truck to receive and empty or dump the cans. Also, the loading of dirt, snow or other material requires the lifting and throwing of the material into the truck. Such loading is time consuming and laborious and during such loading operations the truck is inactive.

This invention has for its salient object to facilitate the loading of trucks and to cut down the labor and time required for this operation.

Another object of the invention is to provide simple and practical power operated truck loading mechanism.

Another object of the invention is to provide truck loading mechanism so constructed and arranged that the maximum service of a truck can be obtained.

Further objects of the invention will appear from the following specification taken in connection with the drawings which form a part of this application, and in which Fig. 1 is a side elevation of a truck having loading mechanism constructed in accordance with the invention;

Fig. 2 is a sectional elevation taken substantially on line 2—2 of Fig. 1;

Fig. 3 is a sectional elevation taken substantially on line 3—3 of Fig. 2;

Fig. 4 is a detail sectional elevation showing the power shaft and gear driven thereby; and Fig. 5 is a top plan view taken in the direction indicated by the line 5—5 of Fig. 2.

The invention briefly described consists of loading mechanism for trucks, comprising a receptacle of suitable size and shape adapted to receive material to be loaded and power connections between the receptacle and a power shaft on the truck whereby the receptacle can be raised or lowered and will dump or discharge the material therein into the truck. The invention further includes automatically operable means whereby the power will be disconnected when the receptacle reaches dumping or discharging position and means is provided for tilting the receptacle to discharge the load therein when the receptacle reaches a predetermined position. Further details of the invention will appear from the following description.

In the form of the invention illustrated, there is shown a truck 10 which may be of any suitable form or shape. The truck has a frame 11 and is equipped with a suitable power unit, such as an internal combustion engine. A shaft 15 is driven by the power unit and has mounted on its rear end a gear 16 which meshes with gears 17 and 18.

The truck frame has mounted thereon a body 20 for receiving material, such as ashes, rubbish, garbage, dirt, or any other material. The body has depending from its rear end, lugs or brackets 21 which are pivoted on stub shafts or pins 22, and the body is mounted in such a manner that the front end can be lifted for the purpose of dumping the contents thereof from the rear end.

A U-shaped frame 25 is secured in any suitable manner to the body adjacent the front end thereof and a similar frame is secured to the body adjacent the rear end thereof. The frames may be of any desired construction and, in the form of the invention illustrated, each frame is formed of channel iron, the flanges or channels facing outwardly.

Each of the frames 25 has hinged thereto at the two lower ends thereof, as shown at 26, an extension 27. The extensions are also formed of channel iron and when swung downwardly to the positions shown in Fig. 1, the extensions are disposed in alinement with the plane of the U-shaped frame. Each extension is held in place by brace rods 30 and 31 secured at one end to the extension and detachably engaging at the opposite end a portion of the truck frame.

In the form of the invention illustrated, means is provided for loading the truck from either or both sides thereof. In order to efficiently and economically load the truck and to permit the maximum service to be obtained from a truck, the material to be loaded into the truck is, in the first instance, dumped into a trough or receptacle 35. It will be understood that a plurality of such receptacles can be provided and after the receptacles have been filled they can be connected to the loading mechanism on the truck and discharged into the truck in a very short space of time.

Each receptacle has casters or rollers 38 on the bottom thereof to facilitate the moving of the receptacle and also has a set of rollers 39 and 40 mounted on one side wall thereof, the two sets of rollers 39 and 40 being suitably spaced so that the rollers of the two sets can be alined with tracks or guide rails 25.

Each receptacle also has mounted at the top of the opposite side wall and adjacent the ends thereof, a roller 45.

In order to prevent the truck body from tilting when a receptacle is being raised or lifted to dumping position, a jack J is pivotally mounted at 46 beneath the truck body and is adapted to swing downwardly to the position shown in Fig. 1, in which position the lower end of the jack will contact with the ground. The jack can be held in inoperative position by means of a strap or loop 47 when no loading is taking place. Straps or loops 48 are also provided for holding the hinged extensions 27 in inoperative position during transportation of the truck and when the truck is not being loaded.

In the form of the invention illustrated, flexible connections are provided between the receptacles and the hoisting mechanism. The driving connections and operating mechanism for the hoisting devices are constructed as follows: A frame 50 is secured to the front wall of the truck body 20 and has mounted therein a pair of shafts 51 and 52. Each shaft has rotatably mounted thereon a drum 53 and a ratchet wheel 54 is carried by each drum.

Each shaft 51 or 52 has also rotatably and slidably mounted thereon a clutch member 55 adapted to coact with a clutch member 56 carried by the drum 53. Each of the clutch members 55 has secured thereto a gear 60 and the two gears 60 are adapted to mesh with the gears 17 and 18, which in turn are driven by the gear 16 carried by the power shaft 15. This construction is clearly shown in Fig. 2.

Each of the clutch members 55 is controlled by a shift lever 61 and by means of this lever can be moved into and out of cooperative engagement with its coacting clutch member carried by the drum 53.

Each of the ratchet wheels 54 is engaged by a pawl 65 normally held in engagement with the ratchet wheel by a spring 67.

Each drum 53 has connected thereto a cable 70. Each of the cables 70 is led upwardly and is secured to a drum 71 secured to a shaft 80 carried by the U-shaped frames 25 at the upper ends thereof.

Each shaft 80 has also secured thereto a drum 81 and to each drum there is secured a cable 82. The cables 82 are led downwardly over rollers 83 mounted at the ends of the upper side edges of the truck body 20 and are secured at their lower ends to eyes 85 mounted on the upper end edges of the receptacle 35.

From the showing in Fig. 1 it will be seen that a drum 81 is secured to each shaft 80 adjacent each end thereof, there being two cables 82 connected to each receptacle for lifting the receptacle.

Each shaft 80 has also secured thereto a brake drum 88. A brake band 89 extends around each of the brake drums 88, one end of each brake band being fixed as shown at 90, and the other end of each brake band being connected to a cable 91. Each cable 91 is connected at its opposite end to a lever 92 mounted on a fixed pivot 93. The other end of each lever is connected by a flexible connection 94 to the pawl 65.

The brake bands 89 are provided for easing or controlling the downward movements of the receptacles and it will be evident from the foregoing description that as one of the levers 92 is swung in a clockwise direction, viewing Fig. 2, the pawl controlled thereby will be released and the rotation of the drum engaged by the brake band will be retarded.

Means is provided for automatically throwing out the clutch 55, 56 when the receptacle controlled thereby has been elevated to dumping position. This is accomplished by means of a lever 100 positioned to be engaged by the upper edge of the receptacle or by the roller 45 adjacent one end of the receptacle.

Each lever 100 is mounted on a fixed pivot 101 formed on a plate 102 carried by the upper end of the front U-shaped frame member 25. The outer arm 105 of the lever is disposed in position to be engaged by the roller 45 and the other arm 106 of the lever is disposed on the opposite side of the frame member 25, as clearly shown in Fig. 5, and is connected by a cable 108 to one of the clutch control levers 61. The cable 108 at its lower end passes around an idler pulley 110 carried by a bracket 111 which is secured to the front wall of the truck body 20.

In order to dump the receptacles when they reach discharging position, each receptacle has a lug 115 at each end thereof, the lugs being formed by extensions of the stub shafts or pins for the rollers 39. Each of the frame members 25 has an outwardly extending lug 116 adapted to be engaged by the lug or shaft extension 115 when the receptacle reaches discharging position. The operation of the lugs 116 and 115 is clearly shown in Fig. 2, in which the left hand receptacle is shown in dumping position by dotted lines.

*Operation*

The receptacles 35 will first be placed in convenient position for receiving the material to be loaded. When the receptacles are loaded, the truck is driven to a position adjacent the receptacles and, if desired, two receptacles can be elevated to discharge their loads simultaneously. The extensions 27 of the frames 25 are then dropped and braced in the position shown in Fig. 1 and the jacks or supports J are also dropped to a position in which they will brace the truck body. The cables 82 are then attached to the eyes 85 of the receptacle and the clutch control lever 61 is manually operated to throw in the clutch. The drum 53 will then be rotated and will wind up the cable 70 and rotate the drum 71. The shaft 80 to which the drum 71 is connected will be rotated thereby and the drums 81 carried thereby will wind up the cables 82, thus lifting the receptacle 35 connected thereto.

When the receptacle reaches a predetermined discharging position, the lugs or shaft extensions 115 will engage the lugs 116 carried by the frames 25 and will be tilted to the dotted line position shown in Fig. 2. When the receptacle has been tilted as shown in Fig. 2, the rollers 45 will engage the cables 82 and will also engage the lever arm 105, thus causing the flexible connection 108 to shift the clutch lever 61 and throw out the clutch. The engagement of the cables 82 by the rollers 45 will, by reason of the elasticity of the cables, cause the receptacle to tilt backwardly away from the cables to a sufficient extent to permit the receptacle to be lowered when the pawl 65 is released from the racket 54.

In order to lower the receptacle, the lever 92 is actuated to release the pawl 66 and simultaneously throw on the brake, thus controlling by means of the brake band, the downward movement of the receptacle.

It will be seen from the showing in Fig. 2 that the clutch control levers and brake control levers of the mechanisms for the two sides of the truck can be manipulated simultaneously by a single operator and, therefore, two receptacles can be simultaneously discharged and returned to load receiving position.

From the foregoing description it will be clear that simple and practical truck loading mechanism has been designed and that by the use of such mechanism the cost of loading trucks can be materially reduced and the service obtained from a truck can be very materially increased.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. Truck loading mechanism comprising a truck, a power shaft thereon, a detachable framework including a set of guide rails mounted on each side of the truck, a receptacle independent of the truck and having rollers on one upstanding side, spaced to engage the desired set of rails, drums operatively connected to be driven by said shaft, cables connected to said drums and adapted for connection to said receptacle, coacting means on the rails and receptacle for tilting the receptacle when it reaches a predetermined position, and means located on said receptacle to engage said cables when the receptacle is tilted, thereby to utilize the elasticity of the cables to return the receptacle from its tilted position.

2. Truck loading mechanism comprising a truck, a detachable framework including sets of guide rails at each side of the truck, said rails having foldable extensions at the lower ends thereof, a plurality of receptacles movable to and from said truck, each having rollers on one side spaced to engage its respective rail extensions, a power shaft on the truck, drums operatively connected to be driven by said shaft and cables connected to said drums and adapted for connection to said receptacles, each of said receptacles having a roller positioned to engage its respective cable when the receptacle is in dumping position, thereby to utilize the elasticity of the cables to return the receptacle back to lowering position.

FREDERICK W. CALDWELL.